United States Patent [19]

Gorney et al.

[11] Patent Number: 4,728,042
[45] Date of Patent: Mar. 1, 1988

[54] DRIP IRRIGATION PROCESS

[75] Inventors: Moshe Gorney; Eldad Dinur, both of Kibbutz Naan, Israel

[73] Assignee: Naan Mechanical Works, Israel

[21] Appl. No.: 729,194

[22] Filed: May 1, 1985

Related U.S. Application Data

[62] Division of Ser. No. 396,409, Jul. 8, 1982, Pat. No. 4,519,546.

[30] Foreign Application Priority Data

Jul. 15, 1981 [IL] Israel ........................................ 63341

[51] Int. Cl.⁴ ............................................. B05B 15/00
[52] U.S. Cl. ...................................... 239/542; 239/600
[58] Field of Search ........................ 239/542, 547, 600; 405/43, 44, 47–49, 40; 138/42

[56] References Cited

U.S. PATENT DOCUMENTS

| | | | |
|---|---|---|---|
| 3,779,468 | 12/1973 | Spencer | 239/547 X |
| 3,797,754 | 3/1974 | Spencer | 239/542 |
| 3,870,236 | 3/1975 | Sahagun | 239/542 |
| 3,873,030 | 3/1975 | Barragan | 239/542 |
| 4,022,384 | 5/1977 | Hoyle et al. | 405/43 X |
| 4,058,257 | 11/1977 | Spencer | 239/542 X |
| 4,210,287 | 7/1980 | Mehoudar | 239/542 |
| 4,385,727 | 5/1983 | Spencer | 239/542 X |
| 4,519,546 | 5/1985 | Gorney | 239/542 |

FOREIGN PATENT DOCUMENTS

| | | | |
|---|---|---|---|
| 2902007 | 4/1980 | Fed. Rep. of Germany | 239/542 |
| 1533554 | 11/1978 | United Kingdom | 239/542 |

*Primary Examiner*—Andres Kashnikow
*Assistant Examiner*—Kevin Patrick Weldon
*Attorney, Agent, or Firm*—Ostrolenk, Faber, Gerb & Soffen

[57] ABSTRACT

Drip irrigation apparatus including a continuous outer tube and a plurality of low rate determining inserts located at desired locations therealong interiorly of the outer tube, the inserts being selected to have one or more of the following features; an outlet chamber which extends over a significant portion of the circumference of the outer tube; a configuration which allows substantial flattening of the outer tube when not in use, a pressure responsive flow controller; a pressure reducing pathway formed solely or partially by the insert and an air pocket spring defined wholly or partially by the insert for cooperation with a pressure responsive flow controller, thereby providing a flow controller which integrally formed as a single unit.

3 Claims, 16 Drawing Figures

DRIP IRRIGATION PROCESS

This is a division of application Ser. No. 396,409, filed July 8, 1982, now U.S. Pat. No. 4,519,546.

FIELD OF THE INVENTION

The present invention relates to drip irrigation apparatus and more particularly to drip irrigation apparatus formed with a continuous extruded tube.

BACKGROUND OF THE INVENTION

A number of types of continuous tube type drippers are known. One type comprises a cylindrical body having a pressure reducing pathway formed on the outer surface thereof, which pathway engages the inner surface of a continuous tube extruded thereabout. It has also been proposed to insert an intermediate layer of material interposed between the pressure reducing pathway of the cylindrical body and the continuous tube.

Another type of continuous tube dripper employs self-contained flow controlled dripper elements which are attached to the inner wall of a continuous tube and provided with outlet apertures therethrough.

All of the above-described drip irrigation apparatus suffers from a number of disadvantages. Significant among these is the requirement for extremely accurate outlet aperture formation in the continuous tube such that the outlet aperture corresponds to the outlet from the pressure reducing pathway. Both linear and radial positioning of the aperture must be achieved with significant accuracy. This requires relatively sophisticated and expensive machinery.

Another difficulty encountered in the manufacture of the conventional continuous tube dripper apparatus arises in the feeding of the interior elements to the extruder which forms the outer tube. Where the interior elements are cylindrical, they cannot be fed on a track located interiorly thereof and thus difficulties of alignment are encountered. Where discrete elements are employed, which do not fill the radius of the cross section of the outer tube, complex apparatus and techniques for positioning the discrete elements on the tube are required.

SUMMARY OF THE INVENTION

The present invention seeks to overcome disadvantages of prior art continuous tube type drip irrigation apparatus and to provide a continuous tube type drip irrigation device which is relatively easy and inexpensive to manufacture.

There is thus provided in accordance with an embodiment of the present invention drip irrigation apparatus comprising a continuous outer tube and a plurality of pressure reducing inserts located at desired locations therealong interiorly of the outer tube, the pressure reducing inserts defining a water inlet communicating with the interior of the outer tube; a pressure reducing pathway located on a portion of a surface, which surface does not extend alongside the entire circumference of the inner surface of the outer tube and a water outlet which extends along a significant portion of the circumference of the outer tube in engagement therewith.

Further in accordance with this embodiment of the invention the pressure reducing pathway surface is configured as a cylindrical section having a different radius than the corresponding inner surface of the outer tube.

Additionally in accordance with an embodiment of the present invention there is also provided an annular rib associated with said insert and disposed in sealing engagement with the inner surface of the outer tube along at least most of its circumference.

Further in accordance with an embodiment of the present invention there is provided drip irrigation apparatus comprising a continuous outer tube and a plurality of pressure reducing inserts located at desired locations therealong interiorly of the outer tube, the pressure reducing inserts each defining a water inlet communicating with the interior of the outer tube and a part of a pressure reducing pathway which is defined also by the cooperating inner surface of the outer tube, the insert extending over less than the entire circumference of the inner surface of the outer tube.

Further in accordance with an embodiment of the present invention, the insert hereinabove described may also be provided with a water outlet which extends along a significant portion of the circumference of the outer tube in engagement therewith.

Additionally in accordance with another embodiment of the present invention there is provided drip irrigation apparatus comprising a continuous outer tube and a plurality of pressure reducing inserts located at desired locations therealong interiorly of the outer tube, the pressure reducing inserts each defining a water inlet communicating with the interior of the outer tube, pressure reducing means, flow controlling means responsive to pressure within said outer tube and water outlet means extending over a significant portion of the circumference of the outer tube in engagement therewith.

In accordance with a further embodiment of the invention, there is provided a flow controlled pressure reducing insert comprising a generally cylindrical element having pressure reducing means formed along a portion of the circumferential thereof and a water inlet to the pressure reducing means, securing means associated with the cylindrical element on either side of the water inlet, a pressure responsive element disposed in the securing means and separating the volume adjacent the water inlet from the remainder of the interior of the cylindrical element, thereby defining a pressure controlled water passageway communicating with the water inlet.

According to one embodiment of the invention the securing means comprise slits formed in the cylindrical element.

Further in accordance with an embodiment of the present invention there is provided a pressure reducing insert for use with a continuous outer tube to define therewith a drip irrigation unit and comprising a pressure reducing pathway defining a portion of a surface of revolution which is arranged for attachment onto the interior wall of an outer tube, the insert spanning less than half of the circumference of the outer tube, thereby permitting substantial flattening of the tube for shipping purposes. The insert may also comprise bendable extension fingers for assiging in proper placement of the insert but without interfering with the flattening of the tube.

BRIEF DESCRIPTION OF THE DRAWINGS

The invention will be more fully understood and appreciated from the following detailed description taken in conjunction with the drawings in which.

DETAILED DESCRIPTION OF THE INVENTION

Figure 1:
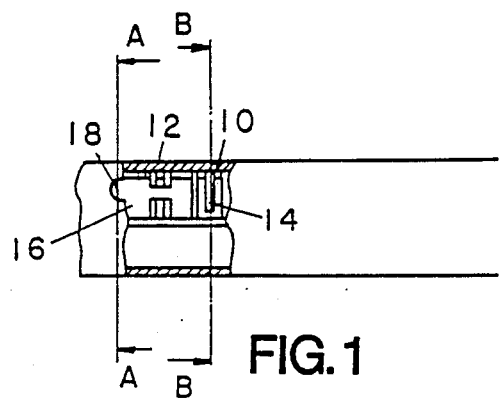
FIG. 1 is a partially cut-away side view illustration of a portion of drip irrigation apparatus constructed and operative in accordance with an embodiment of the present invention.
Figure 2A:
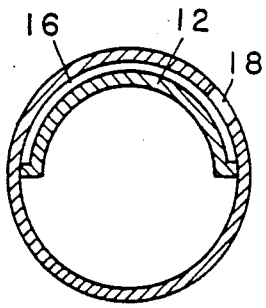
FIGS. 2A and 2B are respective sectional illustrations taken along lines A—A and B—B drawn on FIG. 1.
Figure 2B:
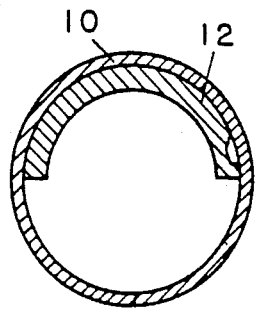

Reference is now made to FIGS. 1, 2A and 2B which illustrate a portion of drip irrigation apparatus constructed and operative in accordance with a preferred embodiment of the present invention. The illustrated drip irrigation apparatus comprises a continuous outer tube 10, typically formed by extrusion and in which are disposed at predetermined intervals inserts 12 which provide output flow control as desired, such that the high pressure water supply within the tube 10 results in a relatively low pressure output at a desired flow rate.

In accordance with the illustrated embodiment, the insert 12 comprises a pressure reducing pathway 14 comprising a plurality of back and forth bends and sub paths or any other suitable configuration and a water outlet chamber 16 communicating with the outlet of the pressure reducing pathway 14. It is a particular feature of the present invention that the water outlet chamber 16 extends across a significant portion of the circumference of the outer tube 10. This feature enables outlet holes 18 to be formed in the outer tube 10 without precise attention to the rotational orientation of the insert therein. It may be appreciated that if chamber 16 extends over at least one-half of the circumference of the tube, as illustrated, the hole making apparatus need have only 50% radial accuracy in order to provide a properly positioned hole. Thus many of the advantages of a full cylindrical insert are provided without the costs for materials that would be required in such a case.

It is appreciated that although the insert illustrated in FIGS. 1, 2A and 2B defines the pressure reducing pathway in cooperation with the inner wall of the outer tube, this need not necessarily be the case. Alternatively the pressure reducing pathway may be defined solely by the insert, and thus not in cooperation with the outer tube.

Figure 3:
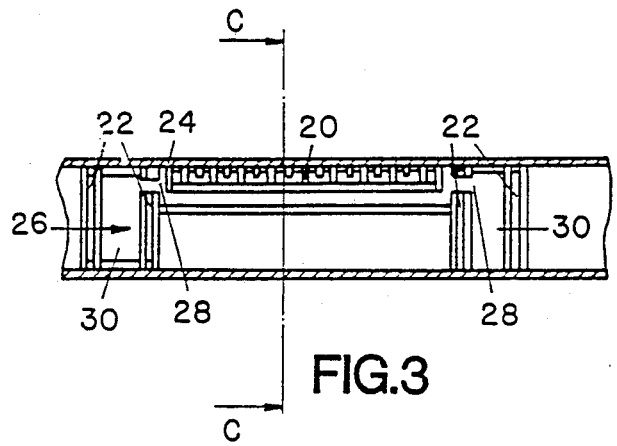
FIG. 3 is a sectional side view illustration of a portion of drip irrigation apparatus constructed and operative in accordance with an alternative embodiment of the present invention.
Figure 4:
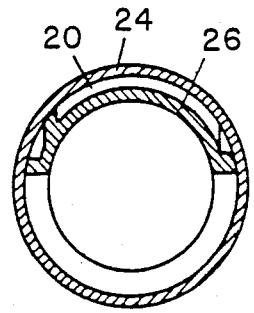
FIG. 4 is a sectional illustration taken along lines C—C drawn on FIG. 3.

Reference is now made to FIGS. 3 and 4 which illustrate drip irrigation apparatus constructed and operative in accordance with an alternative embodiment of the invention in which a pressure reducing path 20 is associated with a plurality of annular ribs 22 which support the path 20 within an outer tube 24. In the illustrated embodiment, an insert 26 comprises the pressure reducing path 20 integrally formed with annular ribs 22 along each side thereof. Transverse slits 28 formed in each of the ribs define an outlet conduit communicating between the outlet of the pressure reducing path to a pair of outlet chambers 30 which extend around the entire circumference of the insert and in engagement with the entire circumference of the inner surface of the outer tube 24. This construction, which uses somewhat more material than that illustrated in FIG. 1, provides a whole circumference water outlet chamber 30 as well as secure positioning of the insert in the tube 24 by means of ribs 22.

It is appreciated that according to an alternative embodiment, only a single rib 22 and only a single water outer chamber 30 may be provided. It is noted that inlets to the pressure reducing pathways illustrated in FIGS. 1, 2A, 2B, 3 and 4 are not seen in the Figures but may be positioned where desired for supply of water from the interior of the outer tube to the pressure reducing pathway. It is also noted that although the term "pressure reducing pathway" is employed herein, the invention also encompasses the use of a flow reducing pathway or other device which need not necessarily reduce pressure, or not reduce pressure as its major objective. Nevertheless all of these devices shall be collectively referred to herein as "pressure reducing pathways".

Figure 5:
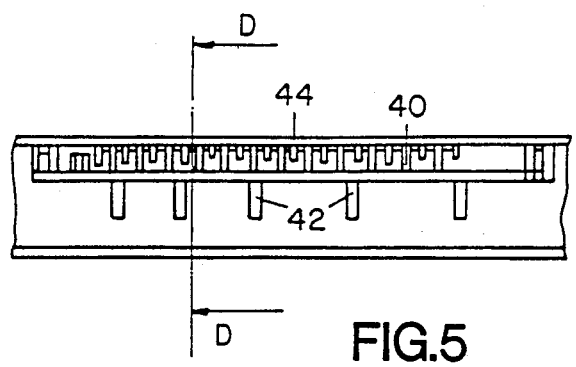
FIG. 5 is a sectional side view illustration of a apparatus constructed and operative in accordance with a further alternative embodiment of the present invention.
Figure 6:
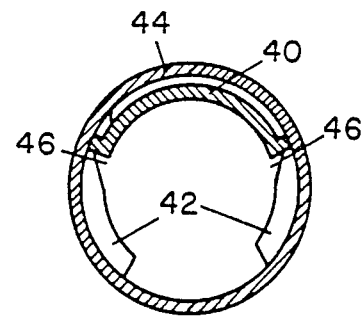
FIG. 6 is a sectional illustration taken along lines D—D drawn on FIG. 5.

Reference is now made to FIGS. 5 and 6 which illustrate drip irrigation apparatus of the type described hereinabove in connection with FIG. 1 with certain modifications. Firstly, the insert 40 shown in FIGS. 5 and 6 extends along less than half of the circumference of the outer tube. Secondly, there are provided bendable extension fingers 42 along both sides of the insert 40 for assisting in positioning of the insert in the outer tube 44. Transversenicks or cuts 46 may be made in the fingers 42 at their junction with the insert 40 to encourage bending thereof when the outer tube is compressed for flattening thereof. It is appreciated that extension fingers 42 may also be applied to the insert illustrated in FIGS. 1, 2A and 2B.

Figure 7:
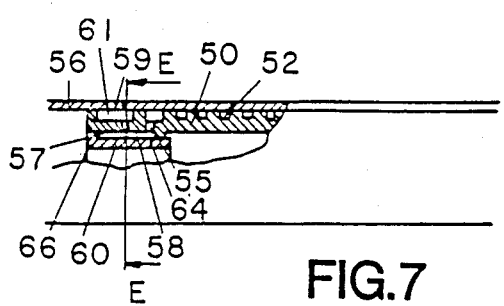
FIG. 7 is a partial sectional side view illustration of a portion of drip irrigation apparatus constructed and operative in accordance with an additional alternative embodiment of the present invention.
Figure 8:
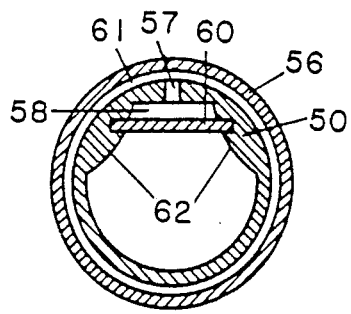
FIG. 8 is a sectional illustration taken along lines E—E drawn on FIG. 7.
Figure 9:
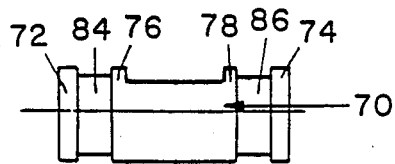
FIG. 9 is a side view illustration of a portion of drip irrigation apparatus constructed and operative in accordance with an embodiment of the present invention.
Figure 11:
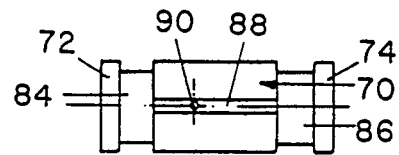
FIG. 11 is a bottom view of the apparatus of FIG. 9.
Figure 10:
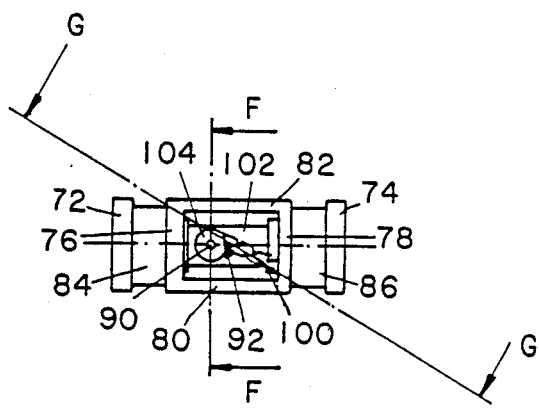
FIG. 10 is a top view of the portion of drip irrigation apparatus of FIG. 9 partially disassembled to have the elastic element removed so as to show the pressure and/or flow reducing pathway.

Reference is now made to FIGS. 7 and 8 which illustrate drip irrigation apparatus constructed and operative in accordance with an alternative embodiment of the present invention and providing pressure responsive flow control. FIGS. 7 and 8 illustrate a cylindrical insert 50 having formed therein a pressure reducing pathway 52 having a water inlet (not shown) and a water outlet 55. The pressure reducing pathway may be of any desired construction and configuration and may be defined soley by the insert or alternatively by cooperation between the insert and the inner wall of the outer tube 56. Adjacent water outlet 55 there is defined an outlet chamber 58 which is defined on one side by the insert 50 and also by a pressure responsive element 60, such as a rubber member. According to the illustrated embodiment of the invention. element 60 is seated on a retaining side support 62 mounted on either side of element 60 onto insert 50. In the illustrated embodiment side supports 62 comprise interiorly extending protrusions integrally formed with the insert 50. Alternatively the side supports may comprise slits in which a rubber member may be inserted.

Element 60 is typically an elastic member such as rubber having a planar portion 64 and an end portion 66. Alternatively it may have two end portions 66 or no end portions. The purpose of element 60 is to modulate the supply of water from the pressure reducing pathway, such that when the line pressure within the outer tube 56 increases, the available cross section for water traversal through chamber 58 is narrowed, thereby to maintain the rate of water supplied from the pressure reducing pathway generally constant notwithstanding variations in the line pressure and to provide generally the same output flow rate at differing line pressures. It is noted that a water outlet 57 is provided from chamber 58 to an annular outlet volume 61 which communicates via an aperture 59 formed in the outer tube 56 with the atmosphere.

It is appreciated that a pressure responsive flow control similar to that provided in the embodiment of FIGS. 7 and 8 may also be provided in the other illustrated embodiments of the invention. The attachment of the elastic member may be through slits or supports formed in the element by suitable conventional molding technique.

Reference is now made to FIGS. 9-13 which illustrate an insert constructed and operative in accordance with an alternative embodiment of the invention, which insert is designed to be disposed at predetermined intervals in a continuous outer tube, such as tube 10, described hereinabove in connection with FIG. 1.

In contrast to the construction of the insert of FIG. 1, wherein the pressure reducing pathway is defined in cooperation with the inner wall of the outer tube 10, in the presently described embodiment, the pressure reducing pathway is defined in cooperation with a pressure responsive element, similar in all relevant respects to element 60 described in connection with FIGS. 7 and 8 hereinabove.

FIGS. 9-13 thus illustrate an insert 70 of generally cylindrical configuration and defining first and second outer annular ribs 72 and 74 and first and second inner ribs 76 and 78. Ribs 76 and 78 are joined along all but the top of the insert and define longitudinal edges 80 and 82. Disposed between respective first inner and outer ribs 72 and 76 is an annular recess which defines an outlet chamber 84. A similar outlet chamber 86 is defined between second inner and outer ribs 74 and 78 in a similar annular recess.

Figure 12:
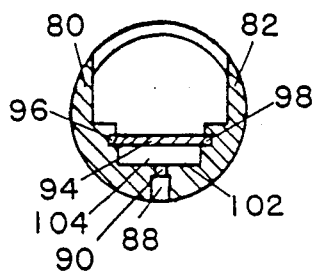
FIG. 12 is a sectional illustration of the apparatus of FIG. 9 taken along the lines F—F drawn in FIG. 9.
Figure 13:
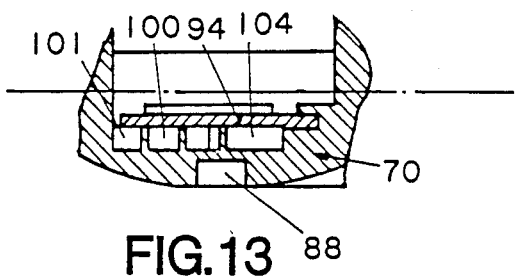
FIG. 13 is a sectional illustration of the appparatus of FIG. 9 taken along the lines G—G drawn in FIG. 9.

Outlet chambers 84 and 86 receive a water output via a recessed conduit 88 which is formed on the underside of insert 70 and which communicates with a transverse aperture 90 extending from a pressure controlled pressure and/or flow controlling chamber 92. Pressure controlled pressure and/or flow controlling chamber 92 is separated from the remainder of the interior of the insert 70 by means of an elastic element 94, typically formed of rubber or a similar material, which functions as a pressure responsive element and is retained in slots 96 and 98 formed in the interior of the insert as seen in FIG. 12.

A pressure controlled pressure and/or flow reducing pathway 100 is defined as part of chamber 92 in the surface 102 of the insert which faces the elastic element 94. This pathway may be of any desired shape and configuration, as desired and suitable. It is noted that the pathway 100 extends from a water inlet 101 extending from the edge of chamber 92 into a pressure and/or flow controlling volume 104, into communication with an aperture 90.

Alternatively, the chamber 92 including pathway 100 may be wholly or partially defined by the elastic element 94.

It is noted that elastic element 94 effectively seals chamber 92 from the remainder of the interior of the insert, which is maintained at line pressure, except at inlet 101. Elastic element 94 thus acts as a pressure sensitive controller of the flow through pathway 100. As the line pressure increases, element 94 is displaced increasingly onto pathway 100 and volume 104, thus reducing its cross sectional area and limiting the flow therethrough. As the line pressure decreases, element 94 is increasingly separated from pathway 100 and volume 104, defining a greater effective cross sectional area for water flow through pathway 100.

It is also possible, if desired, to rigidly the elastic element 94 where it overlies the pathway 100, or to provide a cover over this portion, in order to reduce or eliminate the influence of the line pressure on the cross sectional area of the pathway 100. As a further alternative, the pathway 100 may be located away from the elastic element, as in FIGS. 7 and 8. It is also noted that the apparatus of FIGS. 7 and 8 may alternatively with suitable modification be connected to the inlet of the pressure reducing pathway and the apparatus of FIGS. 9-13 may alternatively be connected to the outlet of the pressure reducing pathway.

According to a further alternative embodiment of the invention, the pressure reducing pathway may comprise a small aperture, typically of a radius of between one tenth to one hundredth of a millimeter, formed in the elastic element 94.

Further in accordance with an embodiment of the invention, the interaction between the elastic element 94 and the pathway 100 may be reduced or eliminated in one of a number of ways. A cover member (not shown) may be provided overlying the elastic element 94 where it overlies the pathway 100. Alternatively the elastic element 94 may not extend over the pathway 100. Where a cover member is provided it may serve to provide prestressing of the elastic element 94 in the area of volume 104. As a further alternative, the elastic element 94 may be prestressed over its entire area covering both the pathway 100 and the volume 104.

According to an alternative embodiment of the present invention the elastic element 94 or element 60 as well as any securing member or cover member associated therewith may be held in place by means of the outer tube which surrounds the insert.

Figure 14:
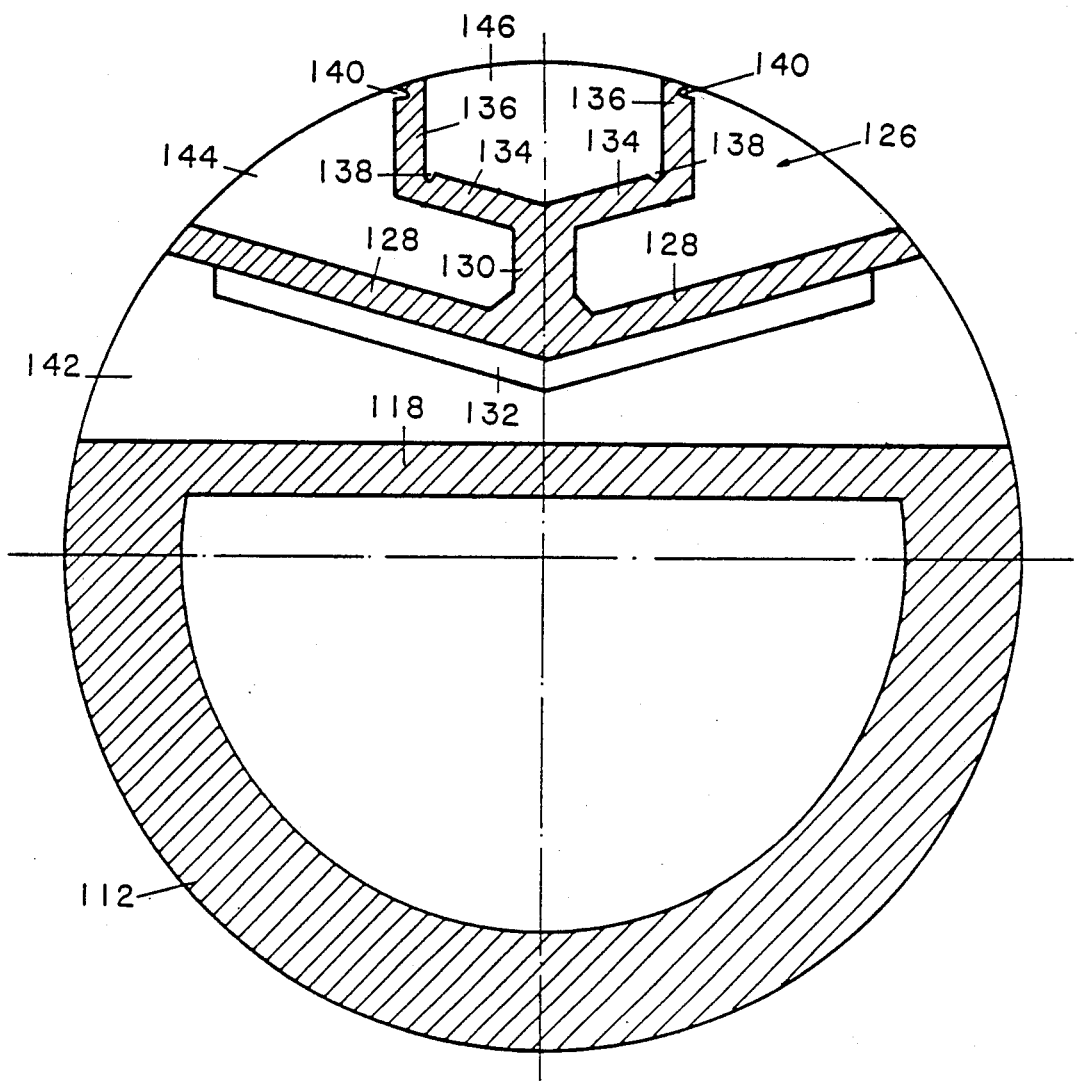
FIG. 14 is a sectional illustration of drip irrigation apparatus constructed and operative in accordance with an alternative embodiment of the invention.
Figure 15:
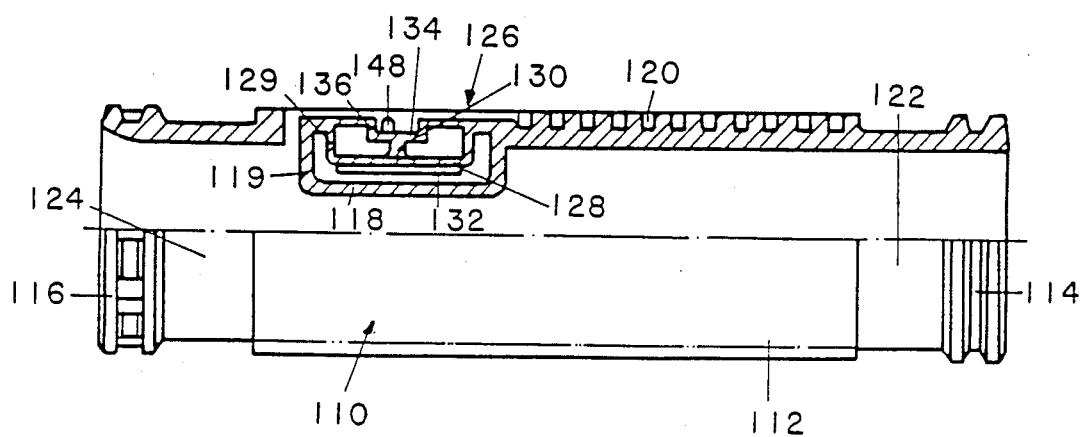
FIG. 15 is a partially cut away view of the apparatus of FIG. 14.

Reference is now made to FIGS. 14 and 15 which illustrate drip irrigation apparatus constructed and operative in accordance with another alternative embodiment of the invention. The drip irrigation apparatus comprises a generally cylindrical insert 110 which is arranged to cooperate with a surrounding sleeve (not shown) to define a drip irrigation unit. Preferably the sleeve is a continuous tube which is extruded around the insert, but this need not necessarily be the case.

Insert 110 comprises a central portion 112 and first and second annular ribs 114 and 116 spaced therefrom to define first and second generally annular outlet volumes refined by annular recesses 122 and 124 respectively. The outlet volumes communicate by means of conduits (not shown) with the outlet or outlets of a pressure and/or flow reducing pathway 120 which is formed over part or all of central portion 112.

Disposed in communication with a water inlet to pressure and/or flow reducing pathway 120 is a pressure responsive flow controller 126 which is operative to maintain a generally uniform flow rate for the drip irrigation unit notwithstanding variations in the line pressure. Controller 126 comprises three separate chambers. A chamber 142, defined by a bottom wall 118 and end walls 119, communicates with the inlet to pathway 120 via an aperture (not shown) and is maintained at the inlet pressure. A second chamber 144 is separated from chamber 142 by means of relatively thin walls 128 having reinforcing ribs 132 and is also defined by end walls 129. The second chamber, when surrounded by the surrounding sleeve is filled with air and sealed and functions, as will be described hereinbelow, as an air spring.

A third chamber 146 is separated from the second chamber by bottom walls 134 and side walls 136 and communicates with the water inlet from the interior of the insert 110 and with the water inlet to pathway 120. Walls 134 are supported on a connecting portion 130 which is integrally formed therewith and with walls 128. A movable barrier 148 is mounted and preferably integrally formed on walls 134 for selectably narrowing the cross sectional area defined by the chamber 146 for fluid flow therethrough from the interior of the insert 110 to the pathway 120.

The junctions between walls 134 and walls 136 are notched as shown at reference numeral 138. Notches are also provided at reference numerals 140 at the top of walls 136. These notches are operative to enhance the ease of upward displacement of walls 134 and 128 and consequent narrowing of the cross sectional area of chamber 146 due to upward displacement of walls 134 and consequently of barrier element 148.

It is a particular feature of the illustrated construction that chambers 142, 144 and 146 are all open in the insert 110, thus permitting convenient molding thereof. These chambers are sealed as desired when a sleeve, such as a continuous tube is sealed peripherally of the insert 110.

In operation, water at the inlet pressure of the inlet to pathway 120 downstream of chamber 146 is present in chamber 142. An increase in the line pressure and consequently in the inlet pressure, as defined hereinabove, causes walls 128, which are constructed to be relatively thin, to be displaced upwardly, in the sense of FIG. 14. The upward displacement of walls 128 causes connecting portion 130 to move upwardly, forcing walls 134 to move upwardly and bend about notches 138, thus moving barrier 148 upwardly and into an orientation whereby barrier 148 increasingly blocks the fluid inlet into the pathway 120 A reduction in pressure correspondingly lowers barrier 148 and walls 134 and 128. It is appreciated that the use of the terms "upwardly" and "downwardly" is only for purposes of illustration with respect to the drawings, since the insert 110 may be oriented for operation in any desired orientation, with controller 126 upwardly, downwardly or in any side position.

It is also a particular feature of the present invention that chamber 144 acts as a spring, since upward movement of walls 128 causes contraction in the volume thereof. Since chamber 144 is a sealed air containing chamber, it tends to resist upward movement of walls 122 and provides a desired restoring force.

It will be appreciated by persons skilled in the art that the present invention is not limited to what has been particular shown and described hereinabove. It is particularly noted that the constructions shown are equally applicable to individual inserts, each surrounded by an individual sleeve as they are to the use of a continuous outer tube.

Thus, the scope of the present invention is defined only by the claims which follow:

1. Drip irrigation apparatus comprising;
   a continuous unseamed outer tube and a plurality of flow rate determining inserts located at desired locations therealong interiorly of said outer tube, said flow rate determining inserts each defining a water inlet communicating with the interior of said outer tube and a part of a flow rate determining pathway which is also defined by the cooperating inner surface of said outer tube, said insert extending over less than the entire circumference of the inner surface of said outer tube.

2. Apparatus according to claim 1 and wherein said pressure reducing pathway is defined on a curved surface which forms part of a cylindrical surface.

3. Apparatus according to claim 1 and wherein said pressure reducing pathway is defined on a curved surface which defines part of a cylindrical surface and wherein said curved surface has a radius greater than the inner radius of said outer tube intermediate said inserts.

* * * * *